(12) United States Patent
Galloway et al.

(10) Patent No.: US 7,433,304 B1
(45) Date of Patent: Oct. 7, 2008

(54) CLASSIFICATION DATA STRUCTURE ENABLING MULTI-DIMENSIONAL NETWORK TRAFFIC CLASSIFICATION AND CONTROL SCHEMES

(75) Inventors: Brett Galloway, Los Altos, CA (US); George Powers, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 1239 days.

(21) Appl. No.: 10/236,149

(22) Filed: Sep. 6, 2002

(51) Int. Cl.
*H04L 12/26* (2006.01)
*G06F 7/00* (2006.01)
*H04L 12/56* (2006.01)

(52) U.S. Cl. .................................... 370/229; 370/412
(58) Field of Classification Search ................ 370/392; 711/221
See application file for complete search history.

(56) References Cited

U.S. PATENT DOCUMENTS

| | | | | |
|---|---|---|---|---|
| 6,105,062 | A * | 8/2000 | Andrews et al. | 709/223 |
| 6,285,658 | B1 * | 9/2001 | Packer | 370/230 |
| 6,308,166 | B1 * | 10/2001 | Breuker et al. | 705/400 |
| 6,385,649 | B1 * | 5/2002 | Draves et al. | 709/224 |
| 6,587,466 | B1 * | 7/2003 | Bhattacharya et al. | 370/395.21 |
| 6,816,456 | B1 * | 11/2004 | Tse-Au | 370/230.1 |
| 6,918,124 | B1 * | 7/2005 | Novik et al. | 719/318 |
| 7,106,732 | B2 * | 9/2006 | Brown | 370/389 |
| 2002/0023089 | A1 * | 2/2002 | Woo | 707/101 |
| 2002/0055998 | A1 * | 5/2002 | Riddle et al. | 709/224 |
| 2002/0122422 | A1 * | 9/2002 | Kenney et al. | 370/392 |
| 2003/0188065 | A1 * | 10/2003 | Golla et al. | 710/243 |
| 2003/0229623 | A1 * | 12/2003 | Chang et al. | 707/3 |

* cited by examiner

*Primary Examiner*—Chau T. Nguyen
*Assistant Examiner*—Timothy J Weidner
(74) *Attorney, Agent, or Firm*—Baker Botts L.L.P.

(57) ABSTRACT

Methods, apparatuses and systems facilitating hierarchical network traffic classification and resource allocation schemes. In one embodiment, the present invention provides traffic classification data structure facilitating creation and configuration of multi-dimensional, hierarchical network resource allocation schemes. The present invention features a hierarchical network traffic classification scheme that allows users to logically embed (or otherwise associate) one or more reference trees within selected traffic class nodes of a given traffic classification tree. In one embodiment, an administrator can create a pool of referenceable traffic classification trees and select such trees or sub-trees from the pool to achieve a variety of different traffic classification configurations. The present invention, in one embodiment, also facilitates the implementation of a system or domain-level workflow interface that features managed access links as configurable objects as opposed to the network devices operating on the access links.

28 Claims, 10 Drawing Sheets

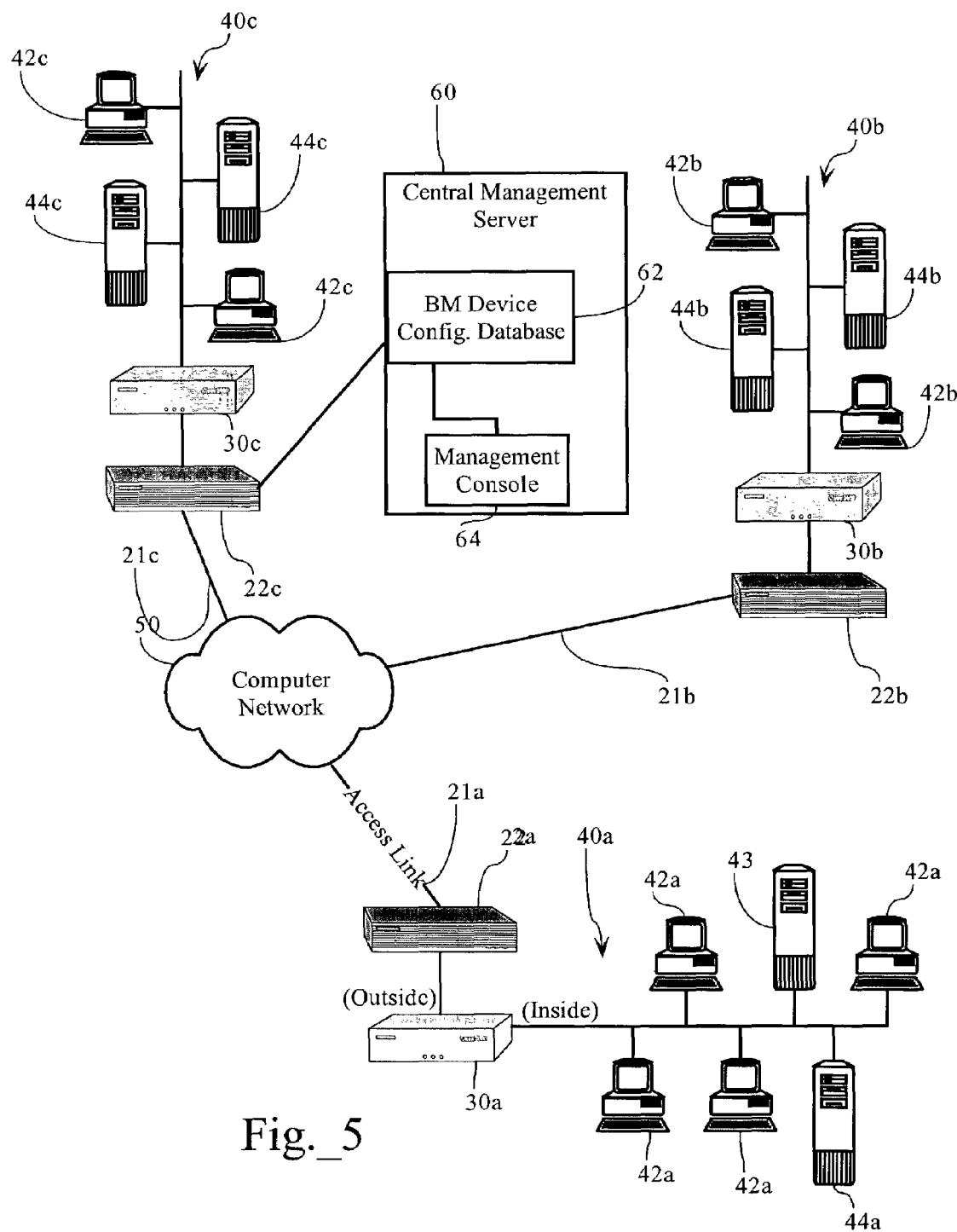
Fig._5

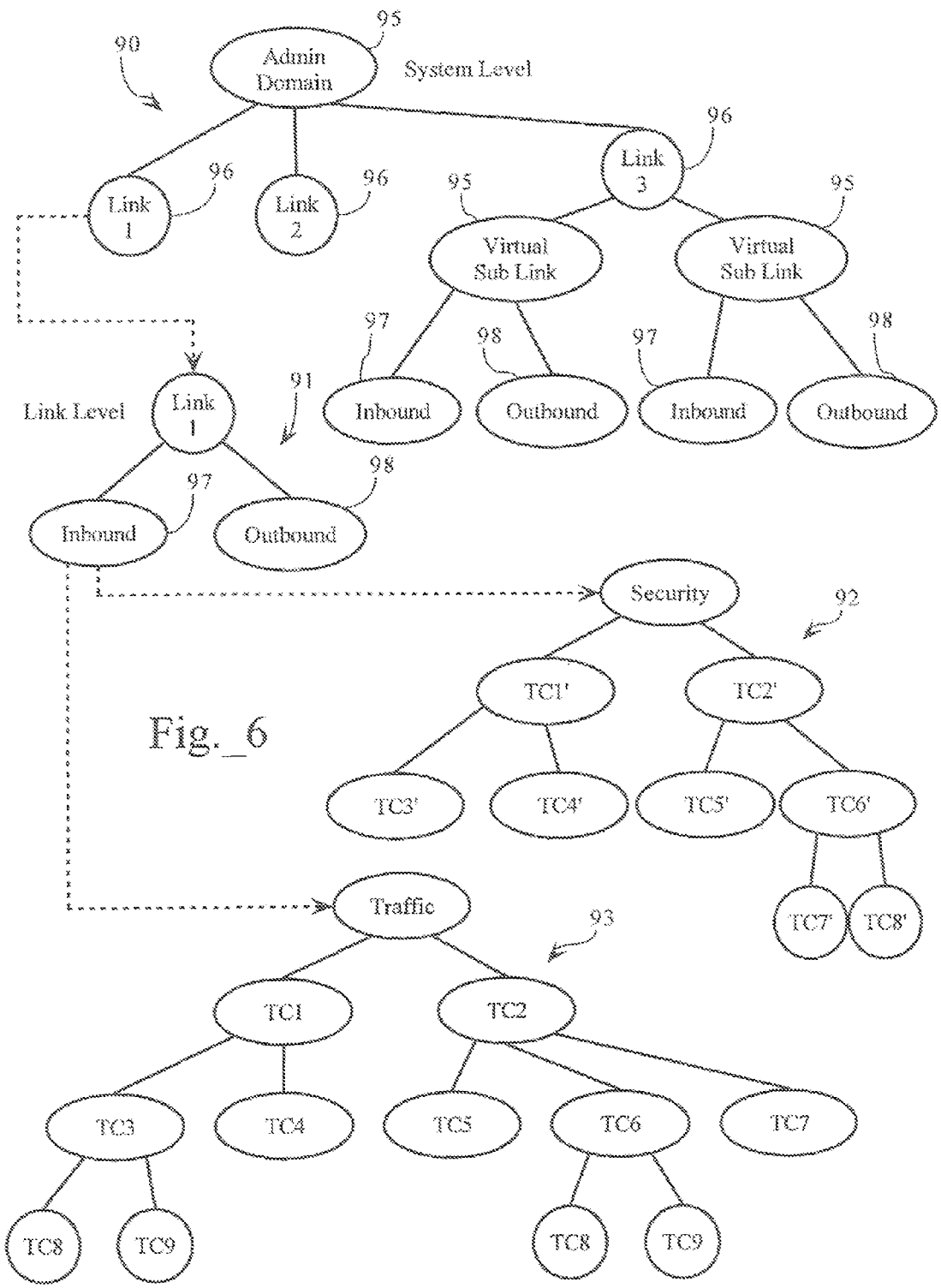
Fig._6

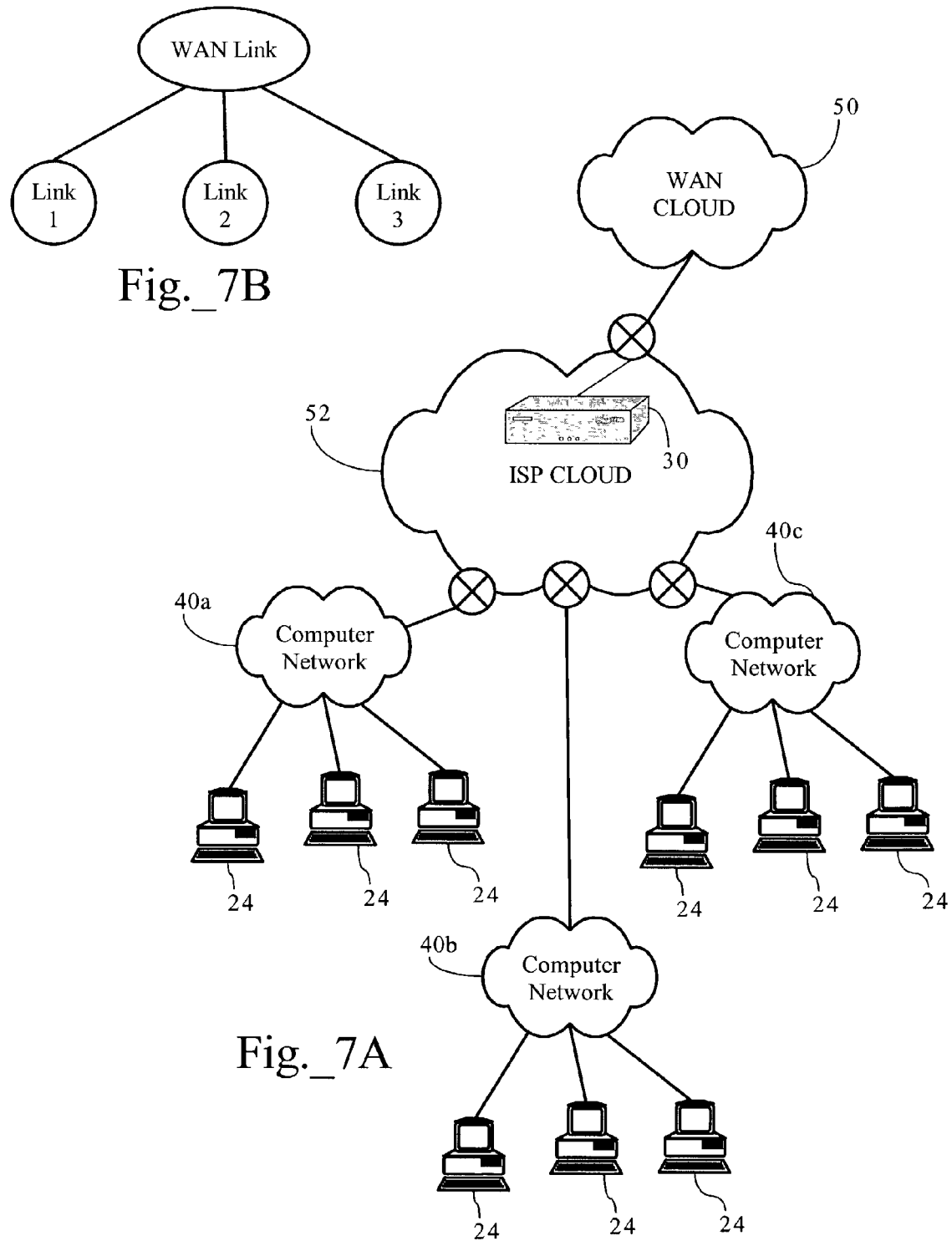
Fig._7B
Fig._7A

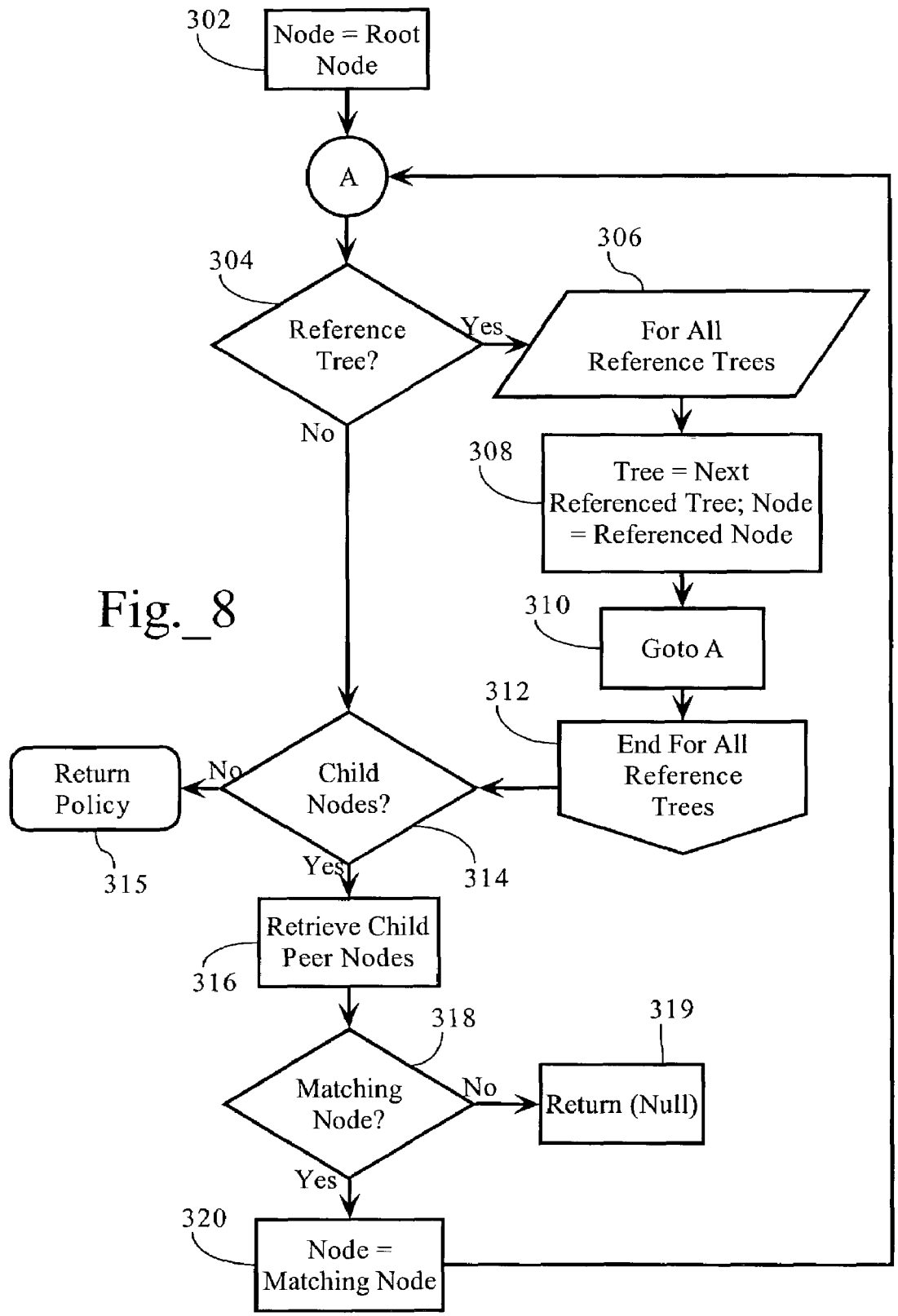
Fig._8

CLASSIFICATION DATA STRUCTURE ENABLING MULTI-DIMENSIONAL NETWORK TRAFFIC CLASSIFICATION AND CONTROL SCHEMES

CROSS-REFERENCES TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;" and U.S. patent application Ser. No. 10/155,936, in the name of Guy Riddle, Robert L. Packer and Mark Hill, entitled "Method for Automatically Classifying Traffic with Enhanced Hierarchy in a Packet Communications Network."

FIELD OF THE INVENTION

The present invention relates to network traffic classification mechanisms and, more particularly, to methods apparatuses and systems enabling a multi-dimensional network traffic classification and control scheme.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgement receipt, i.e., if an acknowledgement is not received within (typically) the smoothed RTT+4* mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgements and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection and bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). In addition, certain bandwidth management devices allow administrators to define a partition hierarchy by configuring one or more partitions dividing the access link and further dividing the parent partitions into one or more child partitions.

To facilitate the implementation, configuration and management tasks associated with bandwidth management and other network devices including traffic classification functionality, various traffic classification configuration models and data structures have been implemented. For example, various routers allow network administrators to configure access control lists (ACLs) consisting of an ordered set of access control entries (ACEs). Each ACE contains a number of fields that are matched against the attributes of a packet entering or exiting a given interface. In addition, each ACE has an associated action that indicates what the routing system should do with the packet when a match occurs. ACLs can be configured to accomplish or facilitate a variety of tasks, such as security, redirection, caching, encryption, network address translation, and policy routing. Once configured by an administrator, the routing system compiles the ACL into a hash table to expedite the look up process during operation of the system.

In addition, U.S. Pat. No. 6,412,000 discloses methods and system that automatically classify network traffic according to a set of classification attributes. As this application teaches, the traffic classification configuration can be arranged in a hierarchy, where classification of a particular packet or data flow transverses a network traffic classification tree until a matching leaf traffic class, if any, is found. Such prior art classification trees are data structures reflecting the hierarchical aspect of traffic class relationships, wherein each node of the tree represents a traffic class and includes a set of attributes or matching rules characterizing the traffic class. The traffic classification, at each level of the hierarchy, determines whether the data flow or packet matches the attributes of a given traffic class node and, if so, continues the process for child traffic class nodes down to the leaf nodes. In certain modes, unmatched data flows map to a default traffic class. In addition, patent application Ser. No. 10/039,992 discloses methods for caching portions of hierarchical classification trees in hash tables to optimize traffic classification lookups.

Although these hierarchical traffic classification schemes are suitable for their intended purposes, they do have certain limitations. For example, the hierarchical configuration constrains current implementation of bandwidth utilization controls and other orthogonal controls or policy types (such as security policies, encryption policies, caching policies, etc.). For example, a particular classification scheme may be desirable for bandwidth utilization controls, while a separate classification scheme may be desirable for a security policy scheme. Prior art systems, however, confine network administrators to a single traffic classification configuration hierarchy that is used for purposes of determining appropriate policies. Moreover, the traffic classification tree data structure, described above, is also problematic when trying to classify network traffic on two different axes in that the classification tree corresponding to a first classification axis must be replicated at all leaf nodes of the traffic classification tree representing a network traffic classification on a second classification axis. Furthermore, the hierarchical traffic classification technologies associated with the prior art do not facilitate natural sharing of traffic classification and/or policy configurations or configuration subsets in a manner that is consistent across different deployment modes.

In light of the foregoing, a need in the art exists for methods, apparatuses and systems allowing for a traffic classification scheme that facilitates configuration of network traffic classification schemes suitable for implementation of orthogonal policies. A need in the art also exists for methods, apparatuses and systems that facilitate the natural sharing of traffic classification configurations, for example, across network devices employing traffic classification functionality, or within a single network device. Embodiments of the present invention substantially fulfill these needs.

SUMMARY OF THE INVENTION

The present invention provides methods, apparatuses and systems facilitating hierarchical network traffic classification and resource allocation schemes. In one embodiment, the present invention provides traffic classification data structure facilitating creation and configuration of multi-dimensional, hierarchical network resource allocation schemes. The present invention features a hierarchical network traffic classification scheme that allows users to logically embed (or otherwise associate) one or more reference trees within selected traffic class nodes of a given traffic classification tree. In one embodiment, an administrator can create a pool of referenceable traffic classification trees and select such trees or sub-trees from the pool to achieve a variety of different traffic classification configurations. In one embodiment, the ability to embed reference trees or reference sub-trees in traffic class nodes of other trees achieves, as discussed more fully below, a variety of advantages associated with configuration and management of a given bandwidth management device or an administrative domain comprising a plurality of bandwidth management devices managing traffic across a plurality of access links. Embodiments of the present invention allow for multidimensional axes of traffic classification and policy, the ability to specify named policy macros and conditional policies, as well as providing for a natural model of policy sharing across multiple links. The present invention, in one embodiment, also facilitates the implementation of a system or domain-level workflow interface that features managed access links as configurable objects as opposed to the network devices operating on the access links.

DESCRIPTION OF THE DRAWINGS

FIG. 5 is a functional block diagram illustrating a computer network environment including a plurality of bandwidth management devices operably connected to a central management server according to an embodiment of the present invention.

FIG. 6 is a diagram illustrating a multi-dimensional traffic classification scheme for a plurality of access links.

FIG. 7A is a functional block diagram illustrating a computer network environment in which a single bandwidth management device manages data flows traversing a plurality of access links to a wide area network; FIG. 7B is a diagram setting forth a system link level view of the managed links corresponding to the computer network environment of FIG. 7A.

FIG. 8 is a flow chart diagram setting forth a method, according to one embodiment of the present invention, directed to traversing a hierarchical traffic classification data structure include one or more embedded reference trees.

DESCRIPTION OF PREFERRED EMBODIMENT(S)

I. Exemplary Operating Environment

Figure 1:
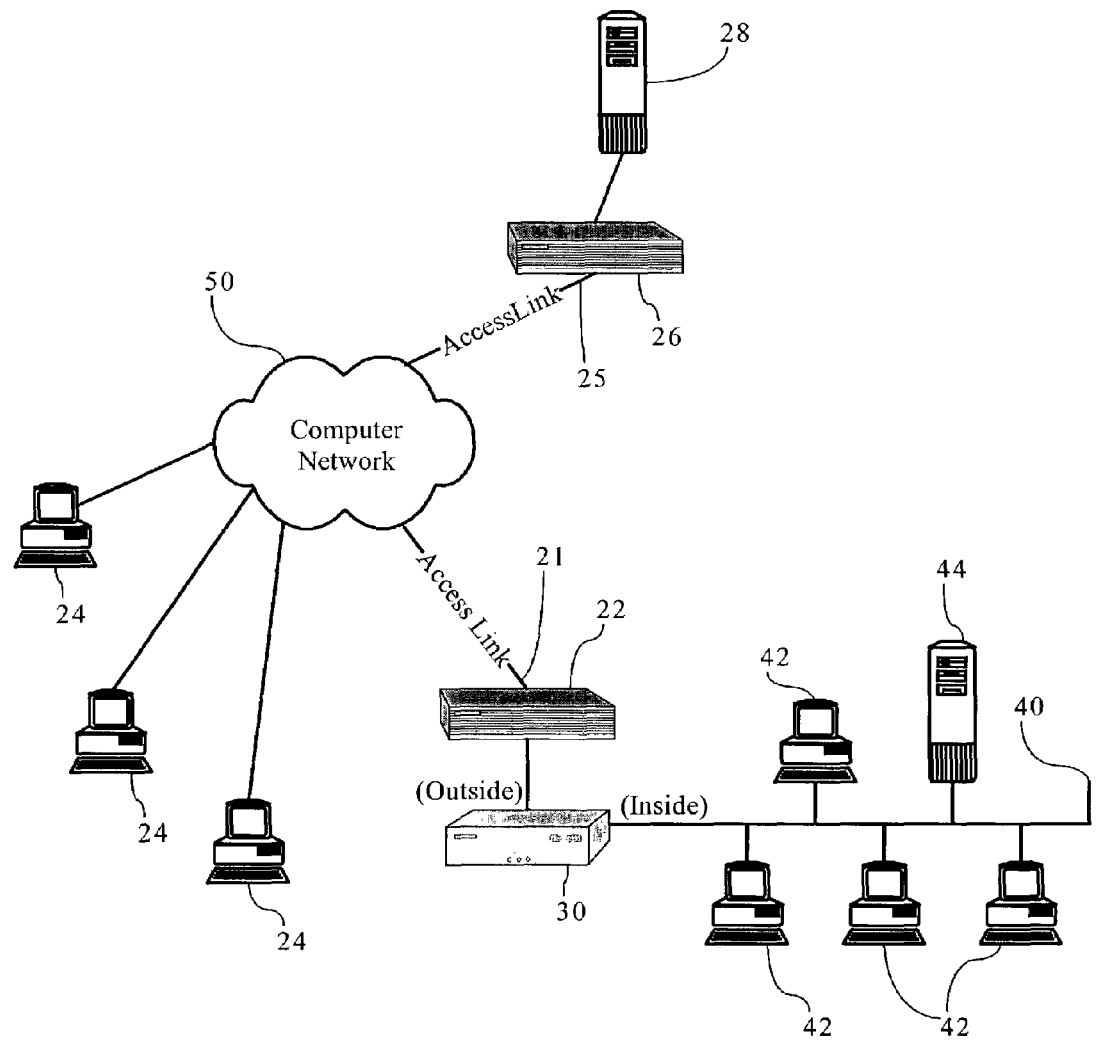
FIG. 1 is a functional block diagram illustrating a computer network environment including a bandwidth management device according to an embodiment of the present invention.

FIG. 1 sets forth a packet-based computer network environment including a bandwidth management device 30. As FIG. 1 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 30 is provided between router 22 and local area computer network 40. Bandwidth management device 30 is operative to classify data flows and, depending on the classification, enforce respective bandwidth utilization controls on the data flows to control bandwidth utilization across and optimize network application performance across access link 21. In addition, FIG. 7 illustrates an alternative deployment configuration for bandwidth management device 30. As FIG. 7 shows, bandwidth management device 30 is deployed in an Internet Service Provider (ISP) domain 52 to manage network traffic between a plurality of separate local area networks 40a, 40b, 40c and wide area network 50.

A. Bandwidth Management Device

Figure 2:
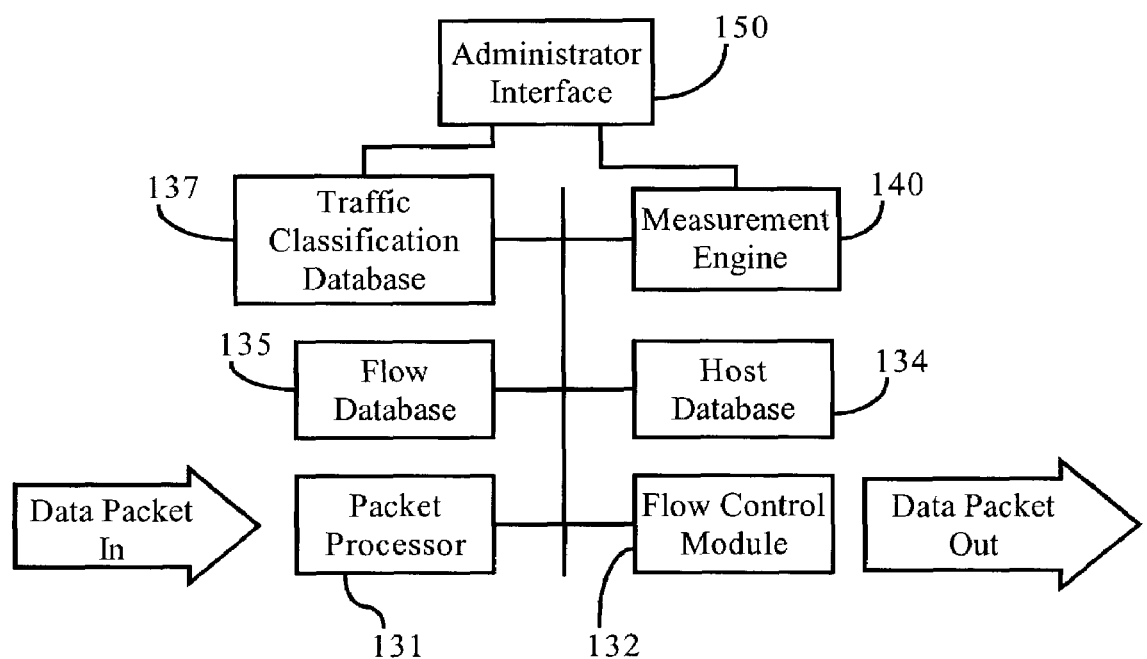
FIG. 2 is a functional block diagram setting forth the functionality in a bandwidth management device according to an embodiment of the present invention.

FIG. 2 is a block diagram illustrating functionality, according to one embodiment of the present invention, included in bandwidth management device 30. In one embodiment, bandwidth management device 30 comprises packet processor 131, flow control module 132, measurement engine 140, traffic classification engine 137, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 30, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls, such as a partition, as well as other controls. Administrator interface 150 also displays various views associated with a hierarchical traffic classification scheme and allows administrators to configure or revise the hierarchical traffic classification scheme as discussed more fully below. Administrator interface 150 can be a command line interface or a graphical user interface accessible, for example, through a conventional browser on client device 42.

A.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, a control block object contains a flow specification object including such attributes as pointer to the "inside" and "outside" IP addresses in host database 134, as well as other flow specification parameters, such as inside and outside port numbers, service type, protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, on one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

A.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

A.2a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, business may use static partitions and a business-wide application suite for its employees, such as PEOPLESOFT ENTERPRISE SOLUTIONS from Oracle Corporation of Redwood shores, Calif. The business may define a static partition for a PEOPLESOFT software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth burst traffic, such as HTTP traffic. In order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.3. Traffic Classification

A traffic class comprises a set of matching rules or attributes allowing for logical grouping of data flows that share the same characteristic or set of characteristics—e.g., a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. As discussed below, administrator interface 150 also allows for the selection and arrangement of traffic classes into hierarchical reference trees (see FIG. 4A).

A.3.a. Hierarchical Traffic Classification and Reference Trees

As discussed above, traffic classification engine 137 stores traffic classification configuration information allowing for classification of data flows. As the various Figures provide, traffic classification engine 137 stores the traffic classes and corresponding data (e.g., attributes, policies, and partition pointers, etc.) related to each traffic class in one to a plurality of hierarchical trees, wherein each node of the tree corresponds to a given traffic class. An individual tree can be configured to indicate parent-child relationships—that is, a particular traffic class may have one or more subordinate child traffic classes with more specific characteristics (matching rules, attributes) than the parent traffic class. For example, at one level a traffic class may be configured to define a particular user group or subnet, while additional child traffic classes can be configured to identify specific application traffic associated with each user group or subnet.

Figure 4A:
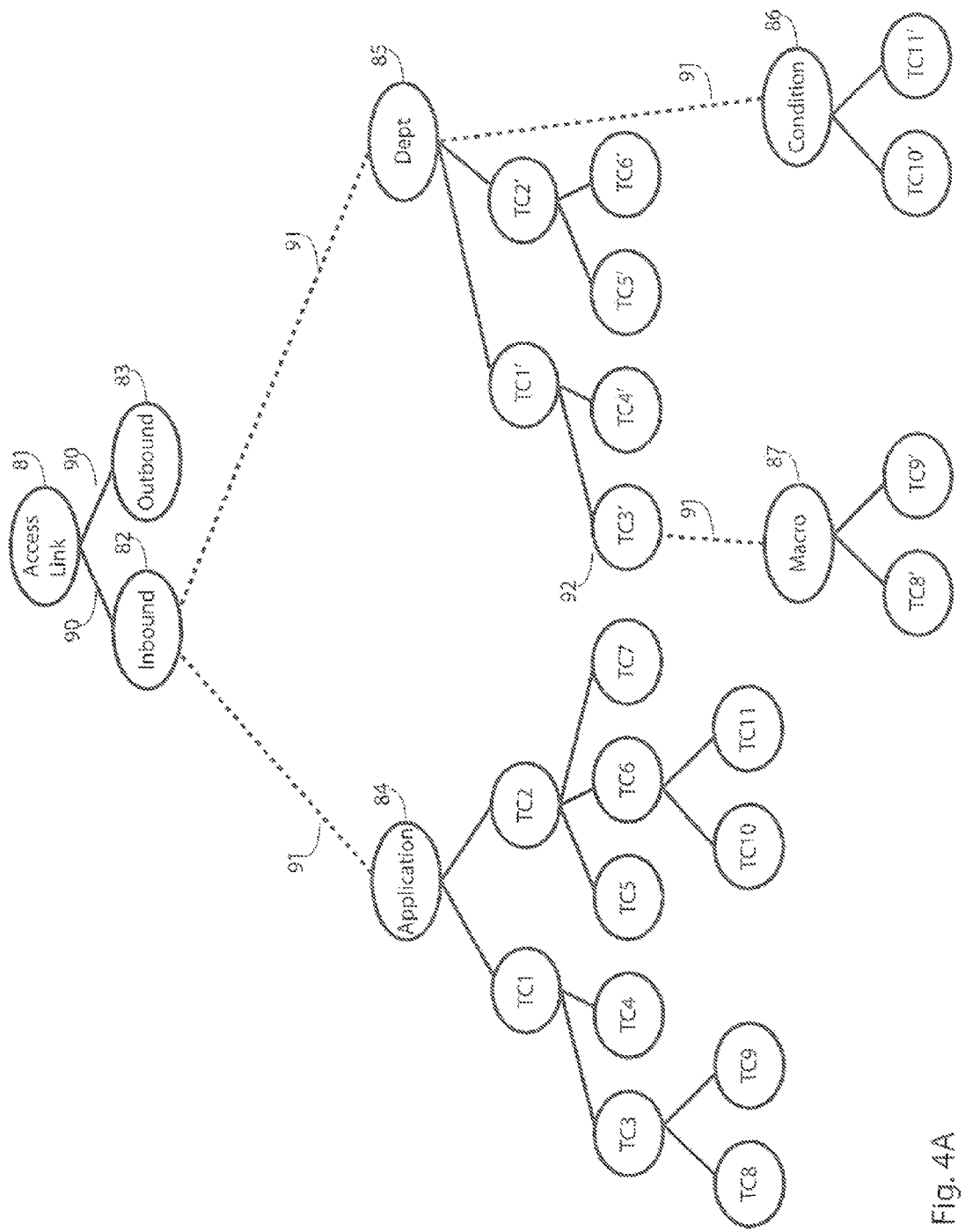
FIG. 4A is a diagram illustrating a multi-dimensional traffic classification scheme for a given access link according to an embodiment of the present invention.

In one embodiment, each traffic class node includes a traffic class identifier; at least one traffic class (matching) attribute; at least one policy parameter (e.g., a bandwidth utilization control parameter, a security policy parameter etc.), a pointer field reserved for pointers to one to a plurality of child traffic classes, if any; and, optionally, one or more reference tree identifiers associated with other traffic classification trees. As FIG. 4A shows, for example, traffic class TC3' 92 includes a reference tree identifier associated with reference tree 87 including peer traffic classes TC3a' and TC3b'. As FIG. 4A shows, non-leaf traffic class nodes (e.g., TC2') may also be configured to reference other traffic class trees (e.g., reference tree 86). See below.

A.3.b. Embedded or Nested Reference Tree Configuration

As FIG. 4A illustrates, bandwidth management device 30 allows users to logically embed (or otherwise associate) one or more reference trees within selected traffic class nodes of other traffic classification trees. In one embodiment, an administrator can create a pool of referenceable traffic classification trees and select trees or sub-trees from among the pool to achieve a variety of different traffic classification configurations. In one embodiment, the ability to embed reference trees or reference sub-trees in traffic class nodes of other trees achieves, as discussed more fully below, a variety of advantages associated with configuration and management of a given bandwidth management device controlling traffic across an access link, or an administrative domain comprising a plurality of bandwidth management devices managing traffic across a plurality of access links.

As FIG. 4A illustrates, references to reference trees, in one embodiment, are contained as attributes of a given traffic class node. In another embodiment, however, a reference to a given reference tree is contained in a child traffic class node of the referencing traffic class node. FIG. 4C illustrates the configuration associated with this embodiment. As FIG. 4C illustrates, child traffic class nodes 89a and 89b of the parent inbound link node reference "application" tree 84 and "department" tree 85 respectively. In such an embodiment, the referenced tree effectively replaces the referencing class as a child of its parent traffic class node. In one embodiment, the referencing class bears the same name as the referenced class. Furthermore, in such an embodiment, the effect of referencing behaves much like a macro invocation. Each reference effectively creates a copy of the referenced tree at that point in the traffic tree.

In one embodiment, administrator interface 150 includes functionality that compiles a hierarchical traffic classification scheme into an executable run-time version. In one embodiment, the run-time version is optimized by converting entire reference trees or subsets thereof into hash tables to facilitate lookups associated with traffic classification. U.S. patent application Ser. No. 10/039,992 discloses optimization of hierarchical traffic classification data structures to optimize classification lookups.

A.3.c. Traffic Type Identification and Automatic Traffic Classification

In one embodiment, bandwidth management device 30 further comprises a traffic discovery engine (not shown), which is operative to apply predefined sets of matching criteria to identify a traffic type associated with data flows traversing bandwidth management device 30. In one embodiment, the traffic discovery engine creates traffic classes automatically in response to data flows traversing bandwidth management device 30 and stores such traffic classes in traffic classification engine 137. Automatic traffic classification is disclosed in U.S. Pat. No. 6,412,000, which is incorporated herein by reference. In one embodiment, the traffic discovery engine must detect a minimum number of data flows within a predefined period for a given traffic type before it creates a traffic class in traffic classification engine 137. In one embodiment, such discovered traffic classes are, by default, attached to or associated with a shared "auto-discovered" reference tree, as appropriate. As discussed below, administrator interface 150 allows for configuration of bandwidth controls for auto-discovered traffic classes. In one embodiment, auto-discovered traffic classes are automatically assigned predefined or default bandwidth utilization controls. U.S. patent application Ser. No. 09/198,051, incorporated by reference herein, discloses automatic assignment of bandwidth utilization controls for discovered traffic classes.

The traffic discovery engine, in one embodiment, is supported by one to a plurality of traffic identification tables in a relational database that allow for identification of a traffic type (e.g., application, service, protocol, etc.) based on the attributes of a particular data flow. In one embodiment, the traffic discovery engine includes a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, the traffic discovery engine analyzes the control block object associated with the data flow against the service attributes in the services table to identify a service ID corresponding to the flow. In one embodiment, the traffic discovery engine may identify more than one service ID associated with the flow. In this instance, traffic discovery engine associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, the traffic discovery engine associates the flow the most specific service ID.

As discussed above, if the traffic discovery engine identifies a threshold number of flows for a given service for which no traffic class has been configured, it will create a traffic class corresponding to the service type in the autodiscovered reference tree maintained in traffic classification engine 137. In one embodiment, the traffic discovery engine constructs a set of matching rules based on the corresponding service attributes in the services table (and/or other tables associated with the service ID) and stores them in association with a traffic class identification in the autodiscovered reference tree. In one embodiment, the traffic discovery engine further stores the default bandwidth management policy associated with the service ID in association with the traffic class node. In one embodiment, the autodiscovered reference tree includes a link tree including an outbound and an inbound node and, attached to each such node, one or more reference trees including traffic class nodes corresponding to discovered traffic classes. In one embodiment, administrator interface 150 allows a user to select a discovered traffic class node, the entire autodiscovered reference tree or sub-tree and add it to an existing traffic classification reference tree, either as native child nodes or as an embedded reference tree.

B. Central Management Server

FIG. 5 illustrates a second computer network environment including a central management server 60 operative to provide a central platform facilitating performance of management functions associated with multiple bandwidth management devices 30*a*, 30*b*, 30*c*. As FIG. 5 illustrates, central management server 60, in one embodiment, includes management console 64 and bandwidth management device configuration database 62. Management console 64 implements the functionality and provides the user interfaces discussed herein. Bandwidth management device configuration database 62 stores device configuration sets for one to a plurality of bandwidth management devices. In one embodiment, central management server 60 provides a platform centralizing management tasks associated with bandwidth management devices, such as configuration tasks and software updates. In one embodiment, central management server 60 facilitates the repetitious task of propagating configuration changes (such as traffic classification configurations) to multiple bandwidth management devices 30*a*, 30*b*, 30*c*. Central management server 60 also provides an overview of all managed devices associated with a given administrative domain. Central management server 60 may be administered by the same administrative entity as bandwidth management devices 30*a*, 30*b*, and 30*c*. Alternatively, the functionality of central management server 60 may be outsourced to a separate administrative entity, such as an ISP or ASP.

C. User Interface for Configuration of Traffic Classification Functionality

Referenceable trees, in one embodiment, are named in a pool, using the form: //<tree>/[class[/class . . . ]], where <tree> is the name of the referenceable tree. For example, if there were a child class foo and grandchild class bar on a referenceable tree splat, the grandchild class would be referred to as //splat/foo/bar. References are formed using the same syntax. This permits references to the root of a referenceable tree, or to a particular sub-tree. Likewise, the reference itself can be optionally named to provide an identifier from the referencing context independent of the chosen reference tree.

As FIG. 4A shows, a given access link (such as access link 21 depicted in FIG. 1) can be represented as a link tree 81 including an inbound leaf node 82 and an outbound leaf node 83. The structure of each link tree can be configured depending on the access link type and parameters associated with the corresponding access link. For example, a full-duplex access link may be represented by a link tree having a single outbound leaf and a single inbound leaf (see FIGS. 4A and 6). In one embodiment, Permanent Virtual Circuits (PVCs) in a frame relay network, for example, may be represented as sets of inbound and outbound pairs (one set for each PVC) in a given link tree. In addition, a half-duplex access link can be represented by a reference tree having a single node in place of the inbound and outbound leaf nodes.

Once a link tree for a given access link is configured, a network administrator may then configure a traffic classification scheme by selecting one or more reference trees (such as a reference tree rooted at 84 or 85 of FIG. 4A) from a pool of reference traffic classification trees and attaching copies of them to the outbound and inbound leaf nodes by including references to one or more reference trees in each node. In another embodiment, a network administrator may attach reference trees to the root link tree node if the same traffic classification scheme is desired for inbound and outbound traffic. As one skilled in the art can realized, embodiments of the present invention allow a network administrator to create a traffic classification tree and quickly impalement the network traffic classification scheme by logically embedding the traffic classification tree in an outbound and/or inbound leaf node of the link tree. In addition, as the various Figures provide, additional reference trees (such as reference tree rooted at 86 or 87 of FIG. 4A) can be logically embedded in traffic class nodes of other reference traffic classification trees to achieve conditional policy and/or policy macro configurations.

In one embodiment, administrator interface 150 is operative to display reference trees individually without any indication of the reference to other trees in individual nodes. In one embodiment, when a user clicks on an individual node, administrator interface 150 presents a view of the parameters associated with the node, such as traffic class identifier, matching attributes, control parameters, and references to other trees. In another embodiment, references to other reference trees may be made visible to the user. In one embodiment, visible references are displayed in the referencing tree, with the reference displayed as a child object of the referencing class, but with a distinct object type. In an embodiment employing a directory-file structure user interface, reference objects embedded at a given traffic class node sort to the top of the peer class list, before native child classes, consistent with the transversal order rules (see below) according to an embodiment of the present invention.

Figure 4B:
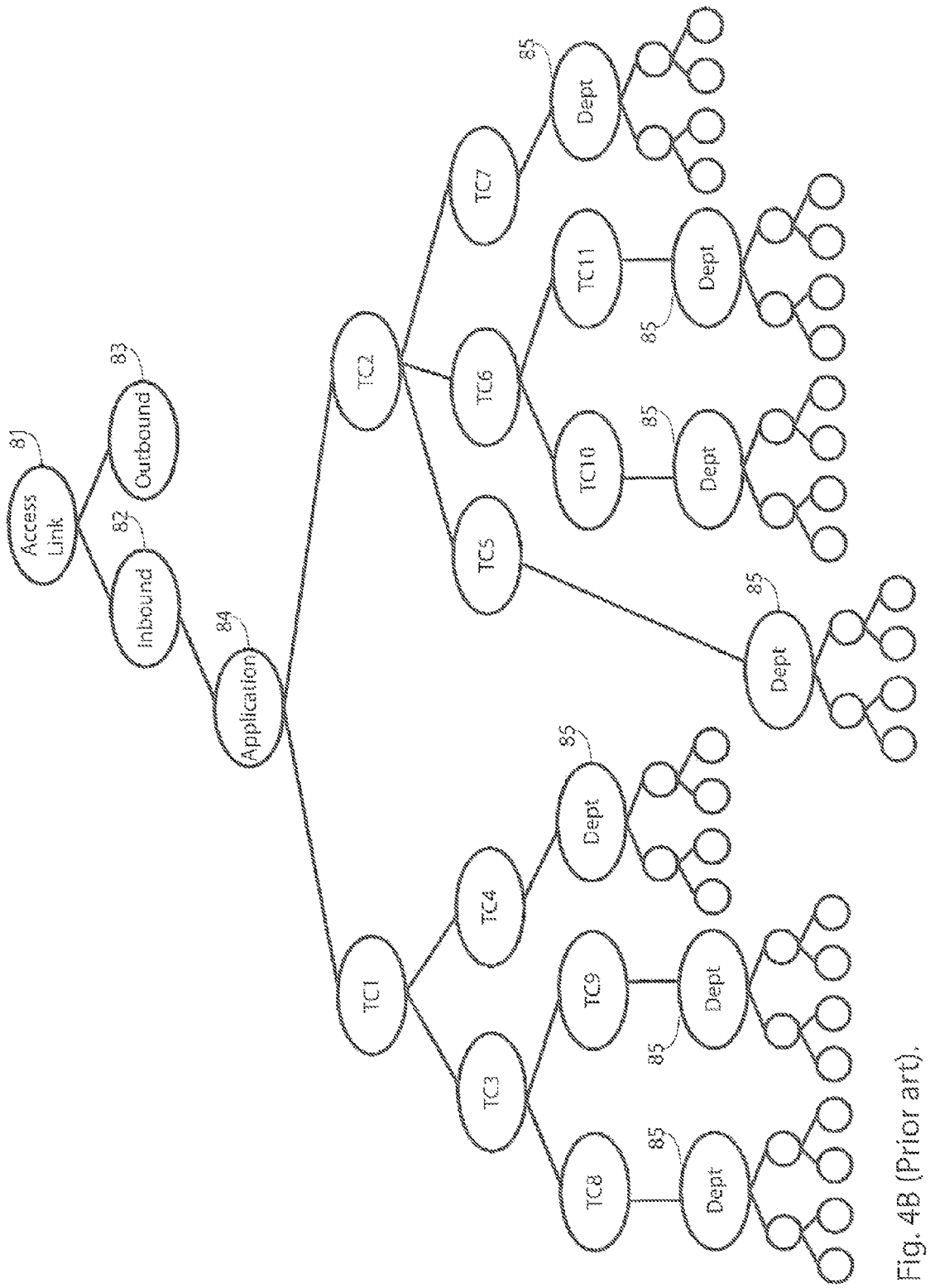
FIG. 4B is a diagram illustrating a prior art hierarchical traffic classification configuration required to approximate the multi-dimensional traffic classification scheme depicted in FIG. 4A.
Figure 4C:
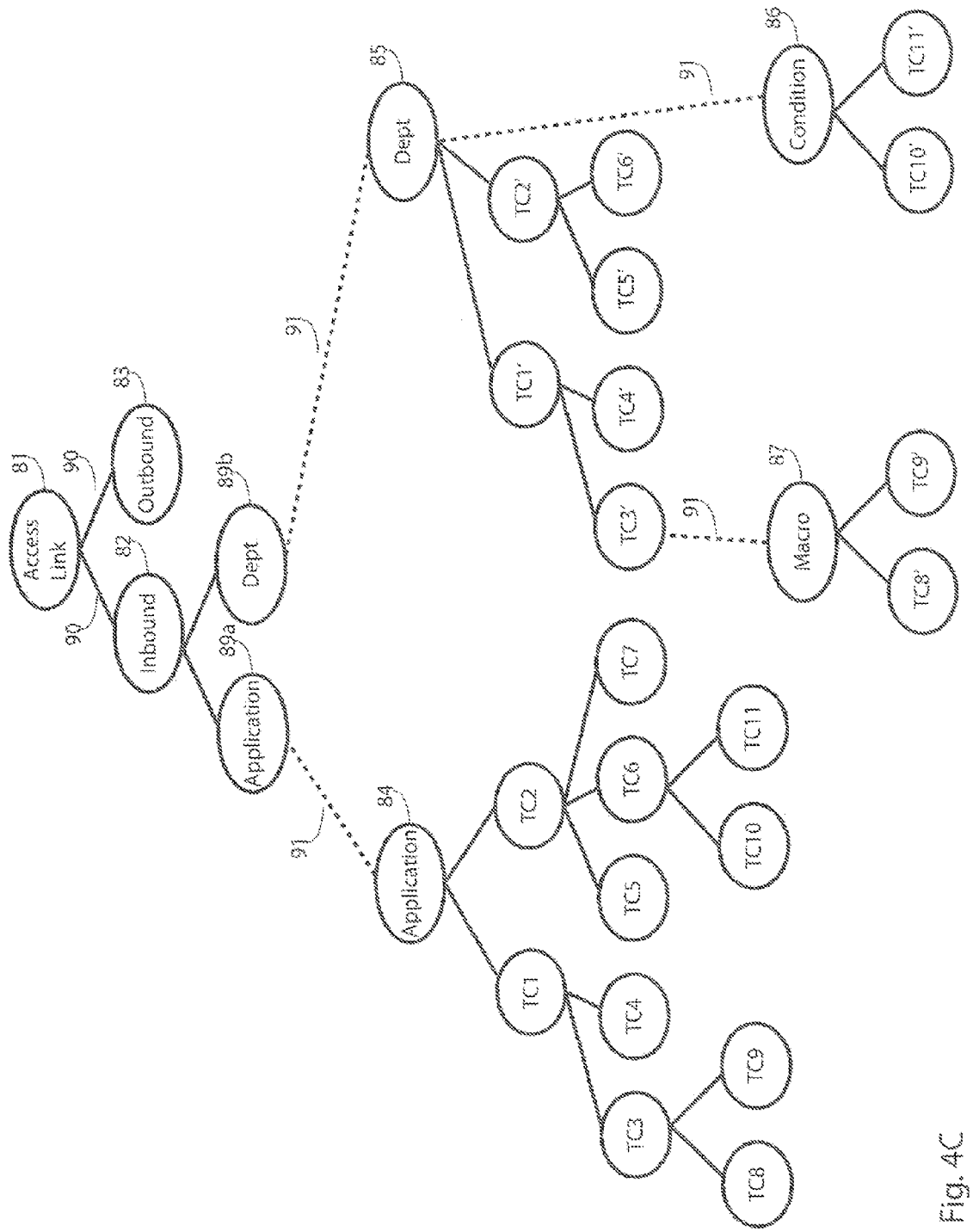
FIG. 4C is a diagram illustrating a multi-dimensional traffic classification scheme according to another embodiment of the present invention.

FIGS. 4A and 4B demonstrate the advantages associated with the referenceable tree model associated with the present invention. For example, embodiments of the present invention provide a natural, conservative model for the configuration of traffic classification functionality on two or more classification axes. As discussed herein, FIG. 4A represents a traffic classification configuration including an "application" reference tree 84 (corresponding to a first axis of classification) and a "department" reference tree 85 (corresponding to a second axis of classification). FIG. 4B illustrates the traffic classification configuration hierarchy necessitated by prior art hierarchical traffic classification data structures and functionality when classifying network traffic on the same two (application and department) axes. As FIG. 4B illustrates, prior art classification data structures require the duplication of the "department" classification tree 85 at all leaf nodes of that part of the classification data structure corresponding to the first classification axis (here, the application axis). This circumstance creates a fragile classification configuration requiring updates to multiple nodes when changes are desired. Accordingly, such prior art functionality also raises the likelihood that the sub-trees associated with the second classification axis become "out-of-phase" rendering it difficult to correlate information along the second classification axis. Moreover, this problem is exacerbated in the context of the inbound/outbound traffic distinction and, even further, where a given bandwidth management device manages multiple access links. In contrast, the configuration scheme enabled by the present invention provides a traffic classification scheme allowing for natural and conservative (i.e., fewer parameters and variables to manipulate) configuration of classifications on two or more classification axes. Specifically, using traffic classification to distinguish network traffic across multiple links is effectively another axis of classification, for which "application" and "department" level classification configurations (as an example, can be easily configured using the same mechanism. In addition, this illustrative example demonstrates the utility of the classification data structures and methods of the present invention in that the same reference tree mechanism can be used for multiple purposes obviating the need for a network administrator to learn new mechanisms to accomplish these tasks.

C1. System Link View

An embodiment of the present invention features a tree data structure hierarchy (as well as associated user interfaces) that facilitates the configuration and management of traffic classification schemes across a set of bandwidth management devices. As FIG. 6 illustrates, embodiments of the present invention provide a model for natural sharing of traffic classification configurations across multiple network devices. For example, FIG 6 illustrates, for didactic purposes, part of a traffic classification configuration for a system comprising a plurality of access links associated with corresponding bandwidth management devices. As FIG. 6 shows, in one embodiment, central management server 60 is operative to provide a traffic classification interface including a system level tree 90 including a root system node 95 and a plurality of link nodes 96 representing the managed access links or a subset thereof. For didactic purposes, link nodes 96 may correspond to access links 21a, 21b and 21c depicted in FIG. 5. As FIG. 6 further illustrates, each link node 96 can be configured to include at least one link tree 91 including nodes 97 characterizing the link. Each node of the link tree can also be configured to refer to one or more traffic classification reference trees, such as traffic, classification trees 92 and 93, which, as discussed above, include traffic class nodes including matching attributes that allow for classification of data flows. In one embodiment, the functionality of central management server 60 is operative to provide this system level and other views associated with the traffic classification and control scheme of the administrative domain.

The access link tree associated with an individual bandwidth management device 30 (e.g., link tree 81 of FIG. 4A) can be conceptualized as a sub-tree of a system link tree. Otherwise, in one embodiment, the administrator interface 150 of an individual bandwidth management device 30 and central management server 60 offer the same views: a link view and views of individual reference trees. A traffic class node in a reference tree is, in one embodiment, multiply-instantiated, at all of the nodes that reference the tree. This is inherently true for nodes in the link tree that correspond to discrete bandwidth management devices 30, as well as for traffic class nodes that co-reside inside a single bandwidth management device 30. As one skilled in the art will realize, this multiple instantiation can potentially become huge (as happens, for example, if there are a large number of bandwidth management devices). To facilitate configuration of traffic classification, the user interface, in one embodiment, applies the context of the extent link view. In other words, if the extant link view details or shows a subset of traffic classes, it is that subset of classes that are viewed when the user attempts to instantiate a traffic class on a reference tree.

As FIG. 6 illustrates, embodiments of the present invention facilitate natural sharing of traffic classification and/or policy configurations or configuration subsets in a manner that is consistent across different deployment modes. As FIG. 6 indicates, the functionality of administrator interface 150 treats and displays a managed access link (e.g., 21a, 21b, 21c) as the configurable object, as opposed to the bandwidth management device (or other network device) operating on the access link, for purposes of traffic classification and control configuration. This interface design concept results in a variety of different mappings of inbound/outbound link pairs, depending on deployment mode, to bandwidth management or other network devices, including:

1) 1:1 mapping: the simplest case where a single bandwidth management device 30 maps to a single access link;
2) N:1 mapping: where a plurality of Permanent Virtual Circuits (PVCs) (or other virtual connections) map to a single bandwidth management device;
3) 1:2 mapping: where two bandwidth management devices 30 are operably connected in parallel to a given access link to provide for parallel redundancy in case of a system failure; and
4) 1:2 mapping: where a bandwidth management device 30 is installed at each end of a given access link.

In the N:1 mapping context, for example, an access link, such as access link 96 of FIG. 6, includes a plurality of virtual sub-links 95 for each PVC or virtual connection. A first reference tree data structure may be configured to include an inbound traffic class node and an outbound traffic class node corresponding to each permanent virtual sub-link or connection in the plurality of virtual sub-links or connection, where the inbound traffic class does include a matching attribute mapping to inbound data flows, and the outbound traffic class nodes include a matching attribute mapping to outbound data flows. Of course, one skilled in the art will recognize that a variety of additional mappings (required by different deployment modes) are possible. For example, as FIGS. 7A and 7B illustrate, sub-classes of a given link node may map to subscriber links between an ISP's network infrastructure 52 and local area computer networks 40a, 40b, and 40c. With mechanisms to highlight individual WAN or other access links as worthy of administrator attention, this model naturally presents traffic classification and policy at a system level, and scales to a large number of access links straightforwardly. In one embodiment, to facilitate management at a system level, administrator interface 150 parameterizes references to access links. In one embodiment, each link node 96 has a data structure including the following fields: 1) access link identifier, 2) access link type, 3) inbound bandwidth, 4) outbound bandwidth, 5) bandwidth management device identifier(s), and 6) reference link tree identifiers. In one embodiment, central management server 60 is operative to display a table displaying the managed access links and the values of the above-identified fields.

Additionally, in one embodiment, central management server 60 and/or administrator interface 150 associated with bandwidth management device 30 features alternate system level views for management tasks not involving traffic classification and/or policy configuration. For example, central management server 60 presents view of bandwidth management device 30 as configurable elements for tasks such as unit provisioning (e.g., device initialization and setup, image distribution, device updates, etc.). However, the workflows related to traffic configuration treat bandwidth management devices as sets of managed access links, whether it be a single inbound/outbound pair, or a set of pairs as in the case of frame relay PVC-based configurations. Accordingly, in one embodiment, the user interface and configuration functionality of central management server 60 and/or bandwidth management device 30 is split into two basic pieces—a unit-focused piece directed to unit provisioning, where setup and image information is specified; and a traffic-focused piece directed to traffic classification and policy provisioning.

In one embodiment, the configuration functionality associated with central management server 60 and the bandwidth management devices operably connected thereto observe certain sharing and inheritance behaviors to facilitate configuration sharing while allowing for per-unit exceptions. As discussed above, the available reference trees at a system level, in one embodiment, result from the combined bandwidth management device and group (system wide) configurations. In one embodiment, if bandwidth management devices and groups contain reference trees by the same name, then the reference tree local to a given bandwidth management device 30 overrides the group tree on a class-by-class basis. The configuration allows for sharing of most of a classification tree, while creating per-unit exceptions for participation classes and their policies. The referencing class itself may also be inherited from a group configuration, and overridden by each unit configuration.

II. Operation

A. Enforcement of Bandwidth Utilization Controls

Figure 3:
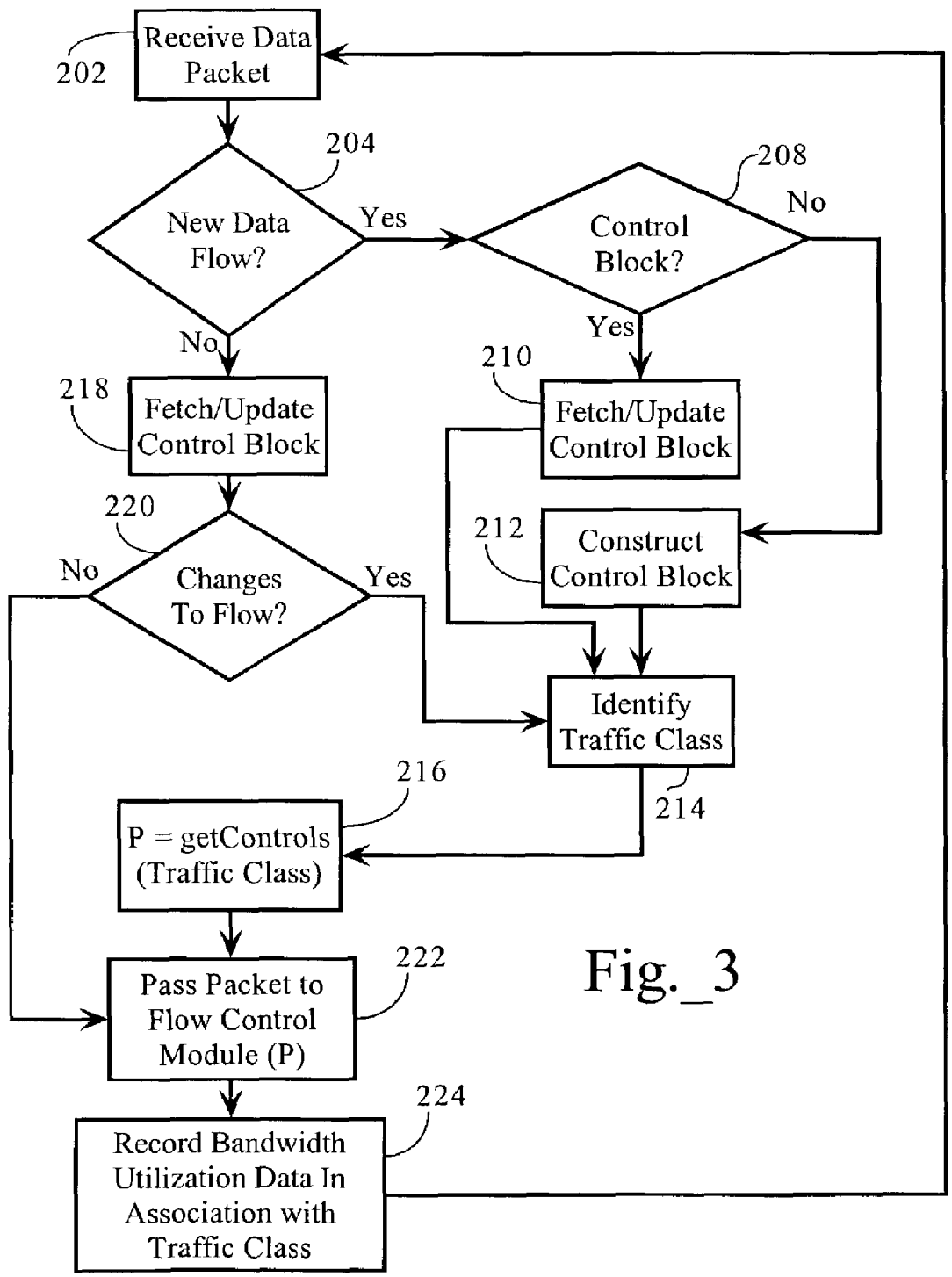
FIG. 3 is a flow chart providing a method directed to processing data packets to allow for enforcement of bandwidth utilization and other controls on network data flows.

FIG. 3 illustrates a method, according to one embodiment, directed to the enforcement of bandwidth utilization controls on data flows transmitted across access link 21 and, therefore, traversing bandwidth management device 30. The method for enforcing bandwidth utilization controls, however, is not critical to the present invention; any suitable method can be employed. In one embodiment, packet processor 131 receives a data packets (FIG. 3, step 202) and determines whether the packet is part of a new data flow (step 204) or represents a change to an existing data flow (see steps 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the packet is a new data flow, packet processor 131 determines whether flow database 135 contains an existing control block object corresponding to the flow (step 208) (see Section A.1., supra). If so, packet processor 131 retrieves the control block object, updates various attributes (e.g., last packet time, etc.), and associates the packet with the control block object (step 210). If flow database 135 does not contain a control block object associated with the new data flow, packet processor 131 constructs a control block object including attributes characterizing the data flow (step 212) (see above). In one embodiment, packet processor 131 analyzes the source and destination IP addresses in the packet header and scans host database 134 for matching entries. If no matching entries exist, packing processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow.

If the packet corresponds to an existing data flow, packet processor 131 retrieves the control block object and updates attributes of the control block object and/or flow specification object as appropriate (step 218). If elements of the data packet represent a change to the traffic type associated with the data flow (step 220), packet processor 131 passes the flow specification object to traffic classification engine 137 to identify a traffic class corresponding to the flow (step 214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the flow specification object (or a pointer to the flow specification object) to traffic classification engine 137. In one embodiment, the flow specification object or a copy of it is stored in association with the packet and in the same buffer structure to facilitate access to the flow specification object by traffic classification engine 137. As discussed in more detail below, traffic classification engine 137 operates on attributes of the control block object and/or flow specification object to identify traffic class(es) associated with the data flow (step 214). In one embodiment, the control block object in flow database 135 includes a pointer to the identified traffic class(es) in traffic classification engine 137. In one embodiment, the traffic classification engine 137 stores in the control block object the policy parameters (e.g, bandwidth utilization control parameters, security policies, etc.) associated with the identified traffic classes.

Rate control module 132 then accesses the control block object corresponding to the data flow to retrieve the bandwidth utilization or other controls (e.g., partition, policy, security controls, etc.) associated with the traffic class (step 216) and enforces the bandwidth utilization controls on the data packet flow (step 222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (step 224) to allow for analysis of bandwidth utilization and other network statistics on a traffic class, access link, and/or partition level.

B. Traffic Classification and Policy Schemes

B.1. Traversal of Traffic Class Nodes and Reference Trees

As discussed above, FIG. 4A illustrates a traffic classification configuration, according to one embodiment of the present invention, implemented by bandwidth management device 30. As FIG. 4A illustrates, network traffic is classified at a link tree level between the inbound traffic leaf 82 and the outbound traffic leaf 83 based on the direction of the data flow. Embedded in the inbound leaf 82 are reference traffic classification trees 84 and 85. Although not shown, outbound leaf 83 also includes at least one embedded reference traffic tree. As FIG. 4A shows, reference traffic trees 84 and 85 are hierarchical tree data structures showing the parent-child relationships among traffic classes. According to the traffic classification configuration shown in FIG. 4A, an inbound data flow triggers two classification process along two different axes. In one embodiment, the traffic classification processes can be computed in series or in parallel. One of ordinary skill in the art will recognize that a classification scheme capable of parallel computation lends itself to optimizations employing parallel CPU architectures. In another embodiment, traffic classification engine 137 operates on the first and second reference trees in a serial manner. As to each individual tree, traffic classification engine 137 operates in a standard manner by applying the attributes defined in individual traffic class nodes to the data flow attributes. The above-identified U.S. Pat. No. 6,412,000 and U.S. patent application Ser. Nos. 10/155,936 disclose methods for traversing hierarchical traffic classification trees. In one embodiment, if a data flow does not match down to a leaf node in a given reference tree, it is considered not to match any traffic class in the reference tree.

Given that a particular traffic class node can have a plurality of child traffic nodes and can also refer to one or more embedded reference trees, however, a reference tree traversal rule set is implemented to establish the order in which traffic classification operations on reference trees or sub-trees are executed. An exemplary rule set according to one embodiment of the present is as follows:
1) If a single traffic class contains multiple reference trees, the order in which the reference trees are configured controls the transversal order.
2) If a single traffic class contains native child classes and one or more reference trees, the reference trees are traversed (in their configured order) before executing classification operations on the native child classes.

Of course, one skilled in the art will recognize that other reference tree traversal rule sets can be configured to achieve different traffic classification behaviors. In one embodiment, the reference tree traversal rule set is also a configurable by a network administrator using administrator interface 150.

FIG. 8 illustrates a method, according to an embodiment of the present invention, directed to traversing a hierarchical traffic classification data structure including one or more embedded reference trees. For didactic purposes, description of the operation of traffic classification engine 137 utilizes the hierarchical traffic classification configuration illustrated in FIG. 4A. When a new data flow is encountered, traffic classification engine 137, beginning with the link tree, classifies the data flow into either outbound or inbound traffic. Specifically, since the root link node (see step 302) does not reference a reference tree (step 304), traffic classification engine 137 matches the data flow to either the inbound leaf node 82 or outbound leaf node 83 depending on the direction of the data flow (see steps 314, 316, 318 and 320). Specifically, if the current node has child nodes (step 314), traffic classification engine 137 applies the matching attributes associated with child nodes to corresponding attributes of the data flow to determine a match (steps 316 and 318). If there is no child node, a leaf node is assumed, causing traffic classification engine 137 to return a traffic classification, and/or a bandwidth utilization control, security policy and/or other control parameter. If no match is found, a null value is returned indicating that no match has been found. If a match is found, traffic classification engine 137 repeats the process for the matching node (see step 320).

As FIG. 8 illustrates, traffic classification engine 137 also determines whether a traffic class node includes at least one reference to a reference tree (step 304) and repeats the process for all reference tress embedded in the current traffic class node. For example, when a data flow is matched to the inbound leaf node 82, traffic classification engine 137 determines whether the leaf node had an embedded reference tree. As FIG. 4A provides, inbound leaf node 82 includes two reference trees 84 and 85. Accordingly, traffic classification engine 137, starting at a first reference tree 84 or sub-tree (see steps 306 and 308) traverses the referenced tree as outlined above (see step 310). This process is repeated for each reference tree, such as tree 85, embedded in the current traffic class node (see steps 306 and 312).

Still further, as one skilled in the art will recognize, the traversal of several different reference trees, depending on the configuration, may result in the return of several policies or other controls, some or all of which may conflict with one another or are otherwise incapable of concurrent implementation with respect to a given data flow. Accordingly, embodiments of the present invention implement conflict rules when traversal of a plurality of reference trees returns conflicting policies. According to one embodiment, in the case of a conflict, a policy or other control emanating from a referenced tree is selected over a control resulting from traversal of the referencing tree. Of course, other conflict rules are possible with each configuration having its own set of advantages and disadvantages.

C. Exemplary Uses of Reference Trees

The referenceable traffic classification tree mechanism according to the present invention can be applied in myriad configurations to achieve an array of different objectives. For example, reference trees can be configured to specify rate and other bandwidth utilization controls (e.g., minimum guaranteed rates, partition caps, etc.) by a proportion or by relative weight depending on a parameter value contained in the referencing traffic class node. Use of reference trees also enables traffic classification schemes featuring multiple, orthogonal axes of traffic classification and control. As discussed below, reference trees may also be used to implement conditional policy rules, and policy macros.

C.1. Multiple Orthogonal Axes of Policy

FIG. 4A illustrates a traffic classification configuration wherein network traffic is classified using an "application" tree 84 and a "department" tree 85. According to the configuration of FIG. 4A, inbound network traffic is, therefore, classified on the basis of network application and other attributes (e.g., HTTP, FTP, SMTP, etc.) and departmental attributes (e.g., inside IP address, subnet, etc.). According to one embodiment, traversal of application tree 84 can yield a per-flow rate policy, for example, while traversal of department tree 85 may yield an aggregate flow control, such as a partition corresponding to a particular department or sub-group. In addition, as FIG. 6 shows, reference trees may be used to configure separate traffic classification schemes for bandwidth utilization controls and other policy types, such as security or redirection policies. For example, "security" reference tree 92 may be configured to classify network traffic for purposes of assigning varying security policies to data flows. "Traffic" reference tree 93 may be configured to independently classify network traffic for purposes of assigning bandwidth utilization controls, such as partitions and rate policies. Still further, the application and department trees 84 and 85, respectively, of FIG. 4A may be logically embedded in inbound leaf node 97 or outbound leaf node 98.

C.2. Conditional Policy Rules

The logically embeddable reference tree model according to embodiments of the present invention provides a powerful way to generalize traffic class matching to express conditional policies. Examples of this include, but are not limited to, time-of-day policies (or other temporal policies), specific overrides in a particular reference context, etc. To implement a time-of-day policy, time of day attribute values can be added to leaf nodes of an embedded reference tree. For example, leaf nodes 88, 89 of reference tree 86 in FIG. 4A can be configured to include different time-of-day attribute values (e.g., time ranges, such as 9am to 5pm, etc.) and associated bandwidth utilization controls or other policies. If the current time associated with a data flow is not equal to the time of day attribute values in either leaf node 88 or 89, no bandwidth utilization or other control is returned. In addition, per-instantiation-context overrides may be expressed by embedded conditions in a reference tree depending upon the instantiation context, such as a parameter value contained in the referencing traffic class node or by including appropriate matching attributes in the leaf or other nodes of a reference tree. For example, the natural case is to have common classification and policy scheme at /Inbound and /Outbound. However, for those instances where a difference in policy is desired, a reference tree may be embedded including attributes that classify traffic based on direction. For example, traffic class node TC2' of department reference tree 85 of FIG. 4A may include a reference to reference tree 86 including leaf nodes 86 and 89 (each with different bandwidth utilization or other controls), wherein leaf node 88 matches to inbound traffic and leaf node 89 matches to outbound traffic.

Permitting reference trees to contain partitions introduces the capability to have "dangling partitions"; i.e. partitions that must be stitched back onto the referencing trees. References from leaf traffic class nodes, or from non-leaf traffic class nodes, that do not contain any native sub-partitions, stitch any partitions from a reference tree or sub-tree in as sub-partitions to the partition of the referencing leaf traffic class. These sub-partitions become peers of any native sub-partitions of the partition of the referencing class. References from non-leaf classes that do contain native sub-partitions naturally represent "conditional partitions", with all of the native sub-partitions replicated under each of the leaf partitions in the reference tree or sub-tree.

C.3. Policy Macros

Still further, reference trees can also be used to set policies by reference rather than by specifying a value. In one embodiment, policy macros can be implemented as named references to trees (or sub-trees) (in the simple case, a reference tree including a single leaf traffic class) that carry some bandwidth utilization control or other policy. For example, traffic class node TC3' 92 of reference tree 85 in FIG. 4A can be configured to refer to reference tree 87 including leaf nodes that include a referring attribute.

Lastly, although the present invention has been described as operating in connection with end systems employing the TCP and IP protocols, the present invention has application in computer network environments employing any suitable transport layer and network layer protocols. In addition, although embodiments of the present invention have been described as operating in connection with bandwidth management devices, the present invention can be applied to a variety of network devices, such as routers, firewalls, caching mechanisms, or other network devices implementing traffic classification functionality. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus comprising:
   a memory for storing network traffic classification data for access by a network resource utilization control device, said network resource utilization control device implementing a network traffic classification and control scheme, the memory comprising: a traffic classification data structure including traffic classification information
   a user interface component operative to allow a user to:
      configure a hierarchical traffic classification configuration including a plurality of reference tree data structures, wherein each reference tree data structure includes at least one node associated with at least one matching attribute,
      select a first reference tree data structure in the plurality of reference tree data structures, and to logically embed the first reference tree in a first node of a second reference tree data structure of the plurality of reference tree data structures;
   wherein the user interface component is operative to compile the hierarchical traffic classification configuration into an executable version of the hierarchical traffic classification configuration including traffic classification data, and store the executable version in the memory.

2. The apparatus of claim 1 wherein the second reference tree data structure represents an access link.

3. The apparatus of claim 2 wherein the second reference tree data structure includes at least one inbound traffic class node and at least one outbound traffic class node; wherein the at least one inbound traffic class node includes a matching attribute mapping to inbound data flows; and wherein the at least one outbound traffic class node includes a matching attribute mapping to outbound data flows.

4. The apparatus of claim 2 wherein the access link includes a plurality of virtual sub-links; and wherein the second reference tree data structure includes an inbound traffic class node and an outbound traffic class node corresponding to each permanent virtual sub-link in the plurality of virtual sub-links; wherein the inbound traffic class nodes include a matching attribute mapping to inbound data flows; and wherein the outbound traffic class nodes include a matching attribute mapping to outbound data flows.

5. The apparatus of claim 2 further comprising a third reference tree data structure representing an administrative domain, and wherein the user interface further allows the user to logically embed the second reference tree data structure in at least one node of the third reference tree data structure.

6. The apparatus of claim 1 wherein at least one node of the first reference tree further includes at least one policy parameter corresponding to a first policy type.

7. The apparatus of claim 6 wherein the first node of the second reference tree data structure in which the first reference tree data structure is embedded is a non-leaf node.

8. The apparatus of claim 6 wherein the first node of the second reference tree data structure further includes at least one policy parameter corresponding to a second policy type, wherein the second policy type is orthogonal to the first policy type.

9. The apparatus of claim 8 wherein the first policy type is a bandwidth management policy type, and the second policy type is a security policy type.

10. The apparatus of claim 1 further comprising a third reference tree data structure, wherein the user interface further allows the user to logically embed the third reference tree data structure in the first node of the second reference tree data structure.

11. The apparatus of claim 1 wherein the at least one matching attribute is a network traffic attribute.

12. The apparatus of claim 1 wherein the at least one matching attribute is a temporal attribute.

13. An apparatus according to claim 1 and further comprising a bandwidth utilization control mechanism operably connected to said memory, said bandwidth utilization control mechanism operative to traverse the traffic classification data structure in response to data flow to identify traffic classes corresponding to the data flows and enforce bandwidth utilization controls on data flows based upon identified traffic classes.

14. The apparatus of claim 13 wherein the bandwidth utilization control mechanism comprises a packet processor, a traffic classification engine, and a flow control module;
   wherein the packet processor is operative to:
      construct control block objects including attributes characterizing data flows traversing the apparatus, and
      associate packets to control block objects;
   wherein the traffic classification engine is operative to:
      operate on control block object attributes and traverse the traffic classification data structure to identify traffic classes associated with data flows traversing the apparatus, and
      associate bandwidth utilization controls to the data flows based on identified traffic classes; and
   wherein the flow control module is operative to enforce bandwidth utilization controls associated with the data flows.

15. The apparatus of claim 1 wherein the user interface is operative to display a graphical representation of the hierarchical traffic classification configuration.

16. The apparatus of claim 15 wherein the at least one node of the first reference tree data structure further includes at least one policy corresponding to a first policy type; and wherein the at least one node of the second reference tree data structure further includes at least one policy corresponding to a second policy type, wherein the second policy type is orthogonal to the first policy type.

17. An apparatus, comprising:
   a memory for storing network traffic classification data comprising: a traffic classification data structure stored in said memory;
   a bandwidth utilization control mechanism operably connected to said memory, said bandwidth utilization control mechanism operative to traverse the traffic classification data structure in response to data flows to identify traffic classes corresponding to the data flows and enforce bandwidth utilization controls on data flows based upon identified traffic classes; and
   a user interface component operative to allow a user to configure a hierarchical traffic classification configuration comprising at least one access link tree data structure operative to store information relating to an access link, said at least one access link tree data structure including at least an inbound traffic leaf node or an outbound traffic leaf node; and a plurality of reference traffic tree data structures, wherein each of said reference tree data structures includes at least one traffic class node; and wherein the at least one traffic class node includes at least one traffic class matching attribute; wherein at least one reference tree data structure is logically embedded in at least one of said inbound or outbound traffic leaf nodes of said at least one access link tree data structure; wherein the user interface component is further operative to allow the user to select a first reference tree data structure in the plurality of reference tree data structures, and to logically embed the first reference tree in at least one node of a second reference tree data structure of the plurality of reference tree data structures; and wherein the user interface component is further operative to compile the hierarchical traffic classification configuration into an executable version of the hierarchical traffic classification configuration including traffic classification data, and store the executable version in the memory.

18. The apparatus of claim 17 wherein the hierarchical traffic classification configuration further comprises a system level tree including at least one access link leaf node, wherein the at least one access link tree data structure is logically imbedded in the at least one access link leaf node.

19. The apparatus of claim 17 wherein hierarchical traffic classification configuration further comprises a first and a second reference tree data structure, wherein at least one traffic class node of the first reference tree data structure references the second reference tree data structure.

20. The apparatus of claim 17 wherein the at least one traffic class node further includes at least one policy parameter.

21. The apparatus of claim 20 wherein the at least one policy parameter is a bandwidth utilization control parameter.

22. The apparatus of claim 20 wherein the at least one policy parameter is a security policy parameter.

23. The apparatus of claim 20 wherein at least one node of the access link tree includes a first policy parameter value; and wherein at least one node of the reference tree data structure includes a policy parameter expression that is operative to return a second policy parameter value dependent on the first policy parameter value.

24. The apparatus of claim 17 wherein the at least one traffic class matching attribute is a network traffic attribute.

25. The apparatus of claim 17 wherein the at least one traffic class matching attribute is a temporal attribute.

26. The apparatus of claim 17 wherein the bandwidth utilization control mechanism is operative to:
  receive a data flow; and
  associate a traffic class to the data flow by traversing the traffic classification data structure in the memory based on the attributes of the data flow and the traffic class matching attributes in the nodes of the traffic classification data structure.

27. The apparatus of claim 26 wherein the at least one traffic class node of the first reference tree data structure further includes at least one policy corresponding to a first policy type; and wherein the at least one traffic class node of the second reference tree data structure further includes at least one policy corresponding to a second policy type, wherein the second policy type is orthogonal to the first policy type.

28. The method of claim 26 wherein to associate the data flow to a traffic class, the bandwidth utilization control mechanism is operative to:
  match attributes of the data flow against the matching attributes associated with a first node in the traffic classification data structure;
  if the attributes of the data flow match the matching attributes of the first node; then:
    if the first node includes a reference tree data structure:
    match attributes of the data flow against the matching attributes associated with at least one node in the reference tree data structure; and
    repeat the matching step against the nodes of the reference tree data structure until a leaf node is matched or no matching attributes are found; and
  if the first node includes child nodes, repeat the matching step for all child nodes of the first node.

* * * * *